3,061,559
URETHANE POLYMER PREPARED FROM AN ORGANIC POLYISOCYANATE AND 2,2-BIS(4-CYCLOHEXANOL)PROPANE

Walter A. Henson and Robert F. Helmreich, Midland, Mich., and Wilbur E. Johnson, Lake Jackson, Tex., assignors to The Dow Chemical Company, Midland, Mich., a corporation of Delaware
No Drawing. Filed Mar. 21, 1960, Ser. No. 16,145
8 Claims. (Cl. 260—2.5)

This invention relates to synthetic urethane polymers. More particularly, it relates to synthetic urethane polymers having new and valuable properties, and to a method for the production of such polymers.

Urethane polymers, as is known to the art, are high molecular weight materials containing repeated urethane linkages corresponding to the formula

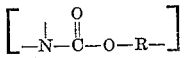

These polymers have found extensive use in recent years in moldings, coatings, laminates, and foams since they have many desirable properties such as good strength, durability, density, light color, and uniformity in addition to being heat and sound insulators. However, these urethane polymers are lacking in resistance to attack by moisture, alkalies, and many common reagents. Accordingly, it is desirable to make urethane polymers that retain the aforementioned desirable properties and at the same time have improved resistance to attack by moisture, alkali, and other common chemicals.

It is among the objects of the present invention to provide new and improved urethane polymers.

A further object of this invention is to provide urethane polymers that are resistant to attack by moisture, alkali, and common chemical reagents.

Another object of this invention is to provide a new method for the preparation of urethane polymers.

These, and other objects which will be evident from the specification, are attained in accordance with the following description.

It has now been discovered that new and improved products are obtained when urethane polymers are made from polyisocyanates and 2,2-bis(4-cyclohexanol)propane. Any of a wide variety of organic polyisocyanates may be used including aromatic, aliphatic, and cycloaliphatic polyisocyanates, and combinations of these types. Representative polyisocyanates from which the polymers of this invention can be made include 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate, 1,4-cyclohexylene diisocyanate, and 1,3-cyclopentylene diisocyanate. Arylene diisocyanates, that is, those in which each of the two isocyanato groups is attached directly to an aromatic ring, are preferred.

In the preparation of the urethane polymers of the present invention the polyisocyanate compound may be mixed with 2,2-bis(4-cyclohexanol)propane in substantially equimolecular amounts but it is often preferred to use more or less than an equimolecular amount of the polyisocyanate compound for particular purposes. For example, it is preferred to use an excess of the polyisocyanate to react with water to yield $CO_2$ in order to obtain foamed resins. The starting materials are employed in amounts corresponding to from 0.8 to 1.2 or more moles of the polyisocyanate per mole of polyol. The polyisocyanate compound is mixed with 2,2-bis(4-cyclohexanol)propane in the presence or absence of another polyhydroxy compound or mixtures thereof such as aliphatic glycols having a continuous aliphatic chain between the two hydroxy groups, and the resulting mixture reacts exothermically to form a highly viscous mass. When heated to a temperature above about 100° C., a very high molecular weight, tough, cross-linked, solid resin having good insulating properties is produced.

Alternative procedures involve the use of a mixture of two or more polyisocyanates, for example, a mixture of 2,4-tolylene diisocyanate and 2,6-tolylene diisocyanate, to be reacted with 2,2-bis(4-cyclohexanol)propane. As hereinbefore stated, polyhydroxy compounds in addition to 2,2-bis(4-cyclohexanol)propane may be present in the initial reaction mixture. The polymer produced by reacting a polyisocyanate with 2,2-bis(4-cyclohexanol)propane in the absence of another polyhydroxy compound produces a hard, rigid resin. It is preferred, however, to conduct the reaction in the presence of other polyhydroxy compounds of such classes as glycols, glycerols, polyesterpolyols, and polyetherpolyols, representative examples of which are ethylene glycol, propylene glycol, butylene glycol, glycerine, polyethylene ether glycols, having average molecular weights between 200 and 600, polypropylene ether glycols having average molecular weights between 250 and 4000, and polybutylene ether glycols having average molecular weights between 500 and 2000.

Polyester polyols may be made by reacting a polybasic acid, such as phthalic acid, with an excess of a polyhydric alcohol such as ethylene glycol.

When high molecular weight polyalkylene ether polyols are present in the reaction mixture in amounts ranging from about 5 to 80 mole percent, the resulting urethane polymers are tough and more flexible than when 2,2-bis(4-cyclohexanol)propane is the only polyhydroxy compound present. Particularly good results are obtained using between about 10 and 40 mole percent of the total constituents present in the reaction mixture of a polyalkylene ether polyol having a molecular weight of between about 300 and 3000.

Commercial grades of 2,2-bis(4-cyclohexanol)propane containing small amounts of such isomers as 2-(2-cyclohexanol) - 2 - (4 - cyclohexanol)propane and 2,2-bis(2-cyclohexanol)propane can be used in the process of this invention.

The polymers of the invention form substantially non-porous, dense solid materials suitable for use as coatings, castings, moldings, and laminates, or, by appropriate alteration of the process, low density, cellular products ranging from rigid foams to flexible spongy materials. Such cellular products can be prepared by incorporating a gas-forming foaming agent such as volatile liquid with the reaction mixture before cross-linking of the polymer has advanced to any appreciable extent. Representative of volatile liquids suitable for forming small gas bubbles in the reacting liquid are trichloromonofluoromethane, hexane, methylchloroform, and symmetrical tetrachlorodifluoroethane. Alternatively, the urethane may be foamed by adding water or carboxyl group-containing compounds to react with excess polyisocyanate contained in the reaction mixture whereby carbon dioxide is liberated and a cellular product is obtained.

Small amounts of a catalyst may be included in the reaction mixture to speed up the rate of the reaction. Representative of suitable catalysts are dibutyl tin dilaurate, cobalt naphthenate and tertiary amines such as triethylamine, N-methyl morpholine, and dimethyl ethanolamine.

If desired, a cell-size control agent can be added to the reaction mixture when foams are made. Materials such as copolymers of polyethylene glycol and dimethyl siloxane which can be made as described in British Patent No. 793,501, may be used for this purpose.

The following examples illustrate the invention but are not to be construed as limiting its scope.

Example I

Into a vessel are charged 0.05 gram-mole of 2,2-bis(4-cyclohexanol)propane, 0.05 gram-mole of 2,4-tolylene diisocyanate and 0.0015 gram-mole of triethylamine. The reaction proceeds exothermically producing a very viscous mass. After a few minutes the mass solidifies to a hard, cross-linked solid resin.

Example II

Charged into a reaction vessel are 0.08 gram-mole of 2,2-bis(4-cyclohexanol)propane, 0.02 gram-mole of a polypropylene ether glycol [HO($C_3H_6O$)$_n$H] having an average molecular weight of 2000 and a viscosity at 77° F. of 230 centistokes, 0.10 gram-mole of a mixture of tolylene diisocyanates, there being 80% of the 2,4-isomer and 20% of the 2,6-isomer present in the mixture. There is then admixed with the above constituents, 0.0006 gram-mole of triethylamine. An exothermic reaction occurs and a highly viscous mass is produced. Upon standing for a few minutes, the mass becomes a tough, horny, water-resistant solid resinous material.

Example III

There are admixed in a vessel 0.083 gram-mole of 2,2-bis(4-cyclohexanol)propane, 0.02 gram-mole of a polypropylene ether glycol [HO($C_3H_6O$)$_n$H] having an average molecular weight of 2000 and a viscosity at 77° F. of 230 centistokes, 0.133 gram-mole of a mixture of tolylene diisocyanates, there being 80% of the 2,4-isomer and 20% of the 2,6-isomer present in the mixture, and 0.0006 gram-mole of triethylamine. The mixture reacts exothermically producing a highly viscous mass. Water in the amount of 0.03 gram-mole is then added to the highly viscous mass and mixed therewith for about 30 seconds. The mixture foams and solidifies to a rigid cellular product.

Example IV

Admixed in a container are 0.02 gram-mole of 2,2-bis(4-cyclohexanol)propane, 0.08 gram-mole of a polypropylene ether glycol [HO($C_3H_6O$)$_n$H] having an average molecular weight of 2000 and a viscosity at 32° F. of 1880 centistokes, and 0.13 gram-mole of 2,4-tolylene diisocyanate. There is then added to the above mixture with stirring, 0.0002 gram-mole of triethylamine. The constituents react exothermically forming a viscous mass. Water in the amount of 0.03 gram-mole is then mixed with the viscous mass, and this mixture is allowed to foam. The foam solidifies into a soft, flexible, spongy, cellular mass.

The superior properties of the polymer of the present invention such as improved resistance to moisture, alkali and other common reagents are attributed to its novel molecular structure. This polymer contains within the main chains structural units corresponding to the formula

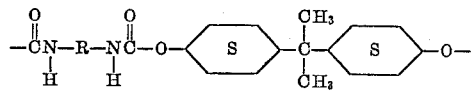

in which R is a low molecular weight divalent organic radical.

Substances such as dyes, delusterants, pigments, fillers, plasticizers, stabilizers, reinforcing materials, fire-proofing agents and flame retardants may be incorporated with the resin of this invention to further alter and improve its properties.

The polymers of this invention can be made into useful articles by conventional molding, casting, coating, and laminating techniques. Foams of these resins can be cast onto a conveyor belt to produce sheets or slabs which may be cut up into convenient sizes for use as bath sponges or for other purposes. Foams made from the polymers of this invention can be cast into molds to make desired shapes or the foams can be cast in place to fill voids in a final article as in the potting of electrical equipment and the strengthening of double walled members.

What is claimed is:

1. The polymeric reaction product of a mixture comprising 2,2-bis(4-cyclohexanol)propane and an organic polyisocyanate.

2. A urethane polymer the molecules of which comprise the reaction product of 2,2-bis(4-cyclohexanol)propane and an organic diisocyanate.

3. A new polymeric material containing in the polymer molecule the reaction product of 2,2-bis(4-cyclohexanol)-propane and tolylene diisocyanate.

4. A new polymeric material containing in the polymer molecule the reaction product of 2,2-bis(4-cyclohexanol)-propane, a polyalkylene ether polyol, and an organic polyisocyanate.

5. A cellular article of manufacture comprising a synthetic resinous polymer made by reacting an organic polyisocyanate with 2,2-bis(4-cyclohexanol)propane, in the presence of a foaming agent.

6. A cellular article of manufacture comprising a synthetic composition made by adding a small amount of water to the viscous reaction products of 2,2-bis(4-cyclohexanol)propane and a molar excess of tolylene diisocyanate.

7. A method of making a synthetic urethane polymer which comprises admixing 2,2-bis(4-cyclohexanol)propane and an organic polyisocyanate in a reaction vessel, exothermically reacting the constituents of the admixture thus formed and recovering a high molecular weight synthetic urethane polymer.

8. A high molecular weight solid synthetic urethane polymer foam comprising the polymerization product of about 31 mol percent 2,2-bis(4-cyclohexanol)propane, about 50 mol percent tolylene diisocyanate and about 8 mol percent of a polypropylene ether glycol having an average molecular weight of about 2000 and about 11 mol percent of water.

References Cited in the file of this patent

UNITED STATES PATENTS

| | | |
|---|---|---|
| 1,593,081 | Jordon | July 20, 1926 |
| 2,284,637 | Catlin | June 2, 1942 |
| 2,731,446 | Wittbecker | Jan. 17, 1956 |
| 2,764,565 | Hoppe et al. | Sept. 25, 1956 |
| 2,926,145 | McConnell et al. | Feb. 23, 1960 |

OTHER REFERENCES

Bayer: Angewandte Chemie, A/59; September 1947, No. 9, pages 257 to 288 (page 261 relied upon).